US007756108B2

(12) United States Patent
Curcio et al.

(10) Patent No.: US 7,756,108 B2
(45) Date of Patent: Jul. 13, 2010

(54) TRANSMISSION OF VOICE OVER A NETWORK

(75) Inventors: Igor Curcio, Tampere (FI); Matti Jokimies, Salo (FI)

(73) Assignee: Nokia Corporation, Espoo (FI)

( * ) Notice: Subject to any disclaimer, the term of this patent is extended or adjusted under 35 U.S.C. 154(b) by 1565 days.

(21) Appl. No.: 10/980,884

(22) Filed: Nov. 2, 2004

(65) Prior Publication Data

US 2005/0152341 A1 Jul. 14, 2005

Related U.S. Application Data

(60) Provisional application No. 60/518,281, filed on Nov. 7, 2003.

(51) Int. Cl.
*H04L 12/66* (2006.01)

(52) U.S. Cl. ........................ 370/352; 370/468; 370/522

(58) Field of Classification Search ................. 370/352, 370/468, 458, 459, 522, 527, 528, 529, 395.4
See application file for complete search history.

(56) References Cited

U.S. PATENT DOCUMENTS 6,839,356 B2 * 1/2005 Barany et al. ............... 370/401
7,257,087 B2 * 8/2007 Grovenburg ................ 370/248
7,289,451 B2 * 10/2007 Bruhn ........................ 370/252
2005/0002400 A1 * 1/2005 Karol et al. ................. 370/394
2007/0248075 A1 * 10/2007 Liu et al. .................... 370/349

OTHER PUBLICATIONS

"RTCP Packet Size Limitation for Voice over IP Traffic"; Nokia Tdoc, S4-020598, 3GPP SA4#23 meeting, Montreal, Canada, Sep. 30 through Oct. 4, 2002.
"Liaison Statement on Optimization of Voice over IMS"; Tdoc S4-030614, 3GPP SA4#28 meeting, Erlangen, Germany, Sep. 1-5, 2003.
"Optimization of Voice over IMS"; Three, Tdoc S2-033102, 3GPP SA2#34, Brussels, Belgium, Aug. 25-29, 2003.
"RTP-RTCP Multiplexing"; Three, Tdoc S2-033127, 3GPP SA2#34, Brussels, Belgium, Aug. 25-29, 2003.
"RTP-RTCP Separation"; Three Tdoc S2-033128, 3GPP SA2#34, Brussels, Belgium, Aug. 25-29, 2003.
"RTCP Removal"; Three, Tdoc S2-033136, 3GPP SA2#34, Brussels, Belgium, Aug. 25-29 2003.
"Technical Specification Group Radio Access Network; Radio Access Bearer Scenarios"; 3GPP TR 25.893 V0.0.3, Nov. 2002.

(Continued)

*Primary Examiner*—Brian D Nguyen
(74) *Attorney, Agent, or Firm*—Ware, Fressola, Van Der Sluys & Adolphson LLP

(57) ABSTRACT

A terminal, system and a method for transmitting voice from the terminal to at least one other terminal over a network. Voice is transmitted in first packets, and control information is transmitted in second packets. A bearer service is reserved from the network for transmission of the first and the second packets. In the terminal, voice activity is detected to determine whether there is voice or silence, wherein detected silence is used for transmitting at least one of the second packets.

22 Claims, 5 Drawing Sheets

OTHER PUBLICATIONS

"Radio Link Control (RLC) Protocol Specification"; 3GPP TS 25.322, v. 5.6.0, Sep. 2003.

"Real-Time Transport Protocol (RTP) Payload Format and File Storage Format for the Adaptive Multi-Rate (AMR) and Adaptive Multi-Rate Wideband (AMR-WB) Audio Codecs", IETF RFC 3267, Jun. 2002.

"RAB support for IMS"; 3GPP RAN WG2 internal Release 6 report (first draft for e-mail review over 3GPP_TSG_ RAN_WG2 distribution list, TR number not yet allocated to the report).

"Handling of variable data rates for conversational IMS"; Siemens, Tdoc R2-030237, 3GPP RAN2#34, Sophia Antipolis, France, Feb. 17-21, 2003.

"RTCP Handling: Separation of Multiplexing"; Alcatel, Tdoc S2-033598, 3GPP SA2#35, Bangkok, Thailand, Oct. 21-27, 2003.

"An Offer/Answer Model with the Session Description Protocol (SDP)"; IETF RFC 3264, Jun. 2002.

* cited by examiner

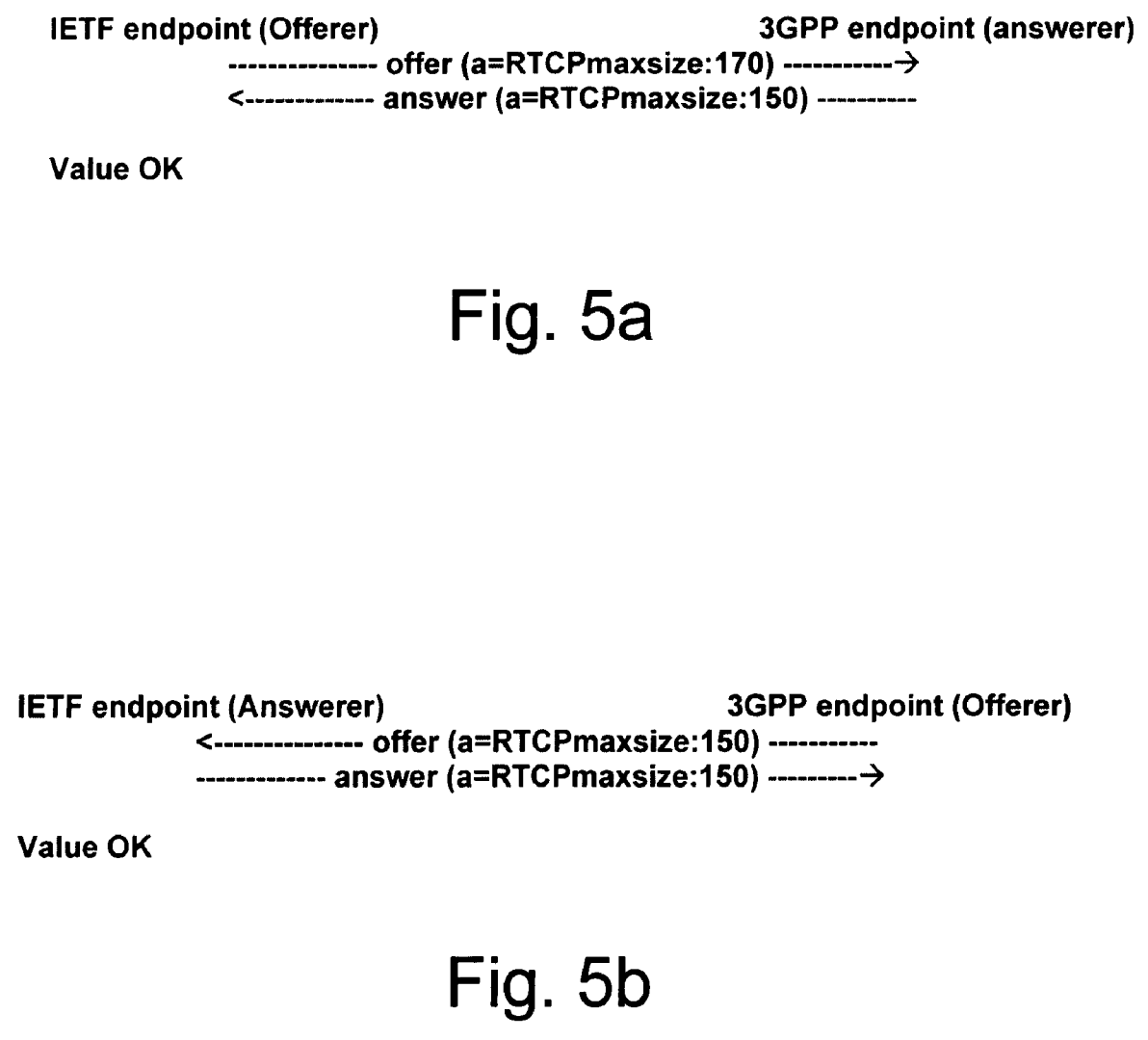

IETF endpoint (Offerer) 3GPP endpoint (answerer)

--------------- offer (a=RTCPmaxsize:170) -----------→

<------------- answer (a=RTCPmaxsize:150) ----------

Value OK

Fig. 5a

IETF endpoint (Answerer) 3GPP endpoint (Offerer)

<--------------- offer (a=RTCPmaxsize:150) -----------

------------- answer (a=RTCPmaxsize:150) ---------→

Value OK

Fig. 5b

TRANSMISSION OF VOICE OVER A NETWORK

CROSS REFERENCE TO RELATED APPLICATIONS

This application claims priority under 35 USC §119 to U.S. Provisional Patent Application No. 60/518,281 filed on Nov. 7, 2003.

TECHNICAL FIELD

The present invention relates to transmission of voice and other multimedia information over a network. The framework of this invention is the transmission system of real-time voice related data over IP-protocol. This is also called as VoIP (Voice Over Internet Protocol). In third generation partnership project IP multimedia subsystem (3GPP IMS) networks, this framework is also called as VoIMS. However, the technology is based on the transport of real-time voice over IP networks. Voice calls can be either point-to-point or conferencing calls. The invention also applies to point-to-multipoint voice connections and video telephony connections, where also other medium other than just voice can be carried (e.g. video).

BACKGROUND INFORMATION

Figure 1:
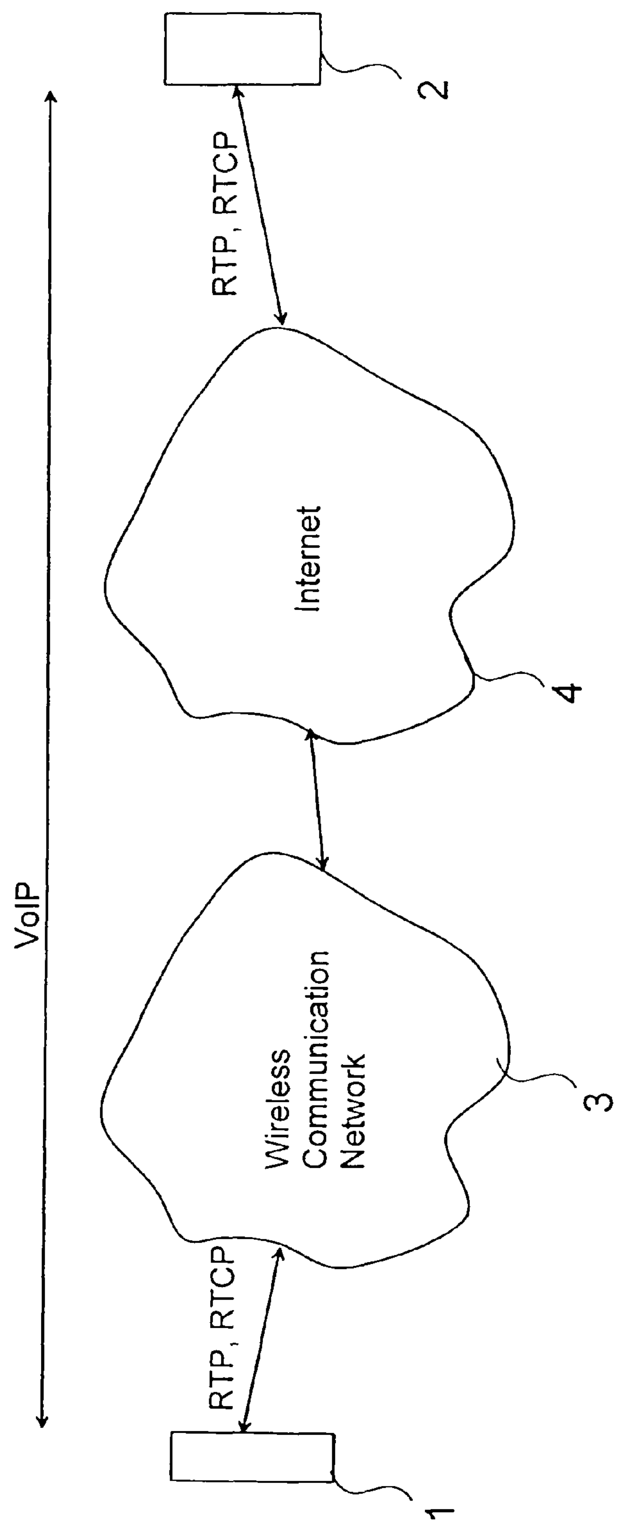

FIG. 1 depicts an example of a conversation session between two terminals 1, 2 using VoIP. In this non-limiting example the terminals 1, 2 are communicating with each other via a wireless communication network 3 and the internet 4. The communication is based on packet transmission using a real-time protocol such as RTP. The RTP packets are encapsulated in packets of a lower layer protocol, such as Internet Protocol (IP). A packet data protocol (PDP) context is created for the VoIP session. The wireless communication network reserves some network resources for the PDP context. These network resources are called as radio bearers in 3$^{rd}$ generation wireless communication systems. During the conversation audio information such as speech is converted into digital form in the terminals 1, 2. The digital data is then encapsulated to form packets which can be transmitted via the networks to the terminal on the other side of the connection. That terminal receives the packets and performs the necessary steps to recover the audio information.

In the following, it is assumed that the real-time protocol (RTP) and real-time control protocol (RTCP) traffic are carried in the same PDP context and radio bearer.

The real-time transport protocol (RTP) provides end-to-end delivery services for data with real-time characteristics, such as interactive audio and video. Those services include payload type identification, sequence numbering, timestamping and delivery monitoring. Applications typically run RTP on top of UDP to make use of its multiplexing and checksum services; both protocols contribute parts of the transport protocol functionality. However, RTP may be used with other suitable underlying network or transport protocols. RTP supports data transfer to multiple destinations using multicast distribution if provided by the underlying network.

The audio conferencing application used by each conference participant sends audio data in small chunks of, for example, 20 ms duration. Each chunk of audio data is preceded by an RTP header; RTP header and data are in turn contained in a UDP packet. The RTP header indicates what type of audio encoding (such as AMR, AMR-WB, PCM, ADPCM or LPC) is contained in each packet so that senders can change the encoding during a conference, for example, to accommodate a new participant that is connected through a low-bandwidth link or react to indications of network congestion.

If both audio and video media are used in a conference, they are normally transmitted as separate RTP sessions. That is, separate RTP and RTCP packets are transmitted for each medium using two different UDP port pairs and/or multicast addresses. There is no direct coupling at the RTP level between the audio and video sessions, except that a user participating in both sessions should use the same distinguished (canonical) name in the RTCP packets for both so that the sessions can be associated.

One motivation for this separation is to allow some participants in the conference to receive only one medium if they choose. Despite the separation, synchronized playback of a source's audio and video can be achieved using timing information carried in the RTCP packets for both sessions.

RTP packet is a data packet consisting of the fixed RTP header, a possibly empty list of contributing sources, and the payload data. RTP payload is the data transported by RTP in a packet, for example audio samples or compressed video data. Some underlying protocols may require an encapsulation of the RTP packet to be defined. Typically one packet of the underlying protocol contains a single RTP packet, but several RTP packets may be contained if permitted by the encapsulation method.

The RTP control protocol (RTCP) is based on the periodic transmission of control packets to all participants in the session, using the same distribution mechanism as the data packets. The underlying protocol should normally provide multiplexing of the data and control packets, for example using separate port numbers with UDP. RTCP performs four functions:

1. The primary function is to provide feedback on the quality of the data distribution. This is an integral part of the RTP's role as a transport protocol and is related to the flow and congestion control functions of other transport protocols. The feedback may be directly useful for control of adaptive encodings, but experiments with IP multicasting have shown that it is also critical to get feedback from the receivers to diagnose faults in the distribution. Sending reception feedback reports to all participants allows one who is observing problems to evaluate whether those problems are local or global. With a distribution mechanism like IP multicast, it is also possible for an entity such as a network service provider who is not otherwise involved in the session to receive the feedback information and act as a third-party monitor to diagnose network problems. This feedback function is performed by the RTCP sender and receiver reports.

2. RTCP carries a persistent transport-level identifier for an RTP source called the canonical name or CNAME. Since the SSRC identifier may change if a conflict is discovered or a program is restarted, receivers require the CNAME to keep track of each participant. Receivers may also require the CNAME to associate multiple data streams from a given participant in a set of related RTP sessions, for example to synchronize audio and video. Inter-media synchronization also requires the NTP and RTP timestamps included in RTCP packets by data senders.

3. The first two functions require that all participants send RTCP packets, therefore the rate must be controlled in order for RTP to scale up to a large number of participants. By having each participant send its control packets to all the others, each can independently observe the number of participants. This number is used to calculate the rate at which the packets are sent.

4. A fourth, optional function is to convey minimal session control information, for example participant identification to be displayed in a user interface of a terminal. This is most likely to be useful in loosely controlled sessions where participants enter and leave without membership control or parameter negotiation. RTCP serves as a convenient channel to reach all the participants, but it is not necessarily expected to support all the control communication requirements of an application. A higher-level session control protocol, which is beyond the scope of this document, may be needed.

An RTCP packet is a control packet consisting of a fixed header part similar to that of RTP data packets, followed by structured elements that vary depending upon the RTCP packet type. Typically, multiple RTCP packets are sent together as a compound RTCP packet in a single packet of the underlying protocol; this is enabled by the length field in the fixed header of each RTCP packet.

Next, some information about speech codecs for VoIP services will be provided. There are basically two types of speech codecs for VoIP services in 3GPP networks in use: Adaptive Multi-Rate Codec (AMR) and Adaptive Multi-Rate Wideband Codec (AMR-WB).

The Adaptive Multi-Rate (AMR) Speech Codec was originally developed and standardized by the European Telecommunications Standards Institute (ETSI) for GSM cellular systems. It is now chosen by the Third Generation Partnership Project (3GPP) as the mandatory codec for third generation (3G) cellular systems. The AMR codec is a multi-mode codec that supports 8 narrow band speech encoding modes with bit rates between 4.75 and 12.2 kbps. The sampling frequency used in AMR is 8000 Hz and the speech encoding is performed on 20 ms speech frames. Therefore, each encoded AMR speech frame represents 160 samples of the original speech. Among the 8 AMR encoding modes, three are already separately adopted as standards of their own. Particularly, the 6.7 kbps mode is adopted as PDC-EFR, the 7.4 kbps mode as IS-641 codec in TDMA, and the 12.2 kbps mode as GSM-EFR.

For AMR the maximum RTP payload size (encapsulating 1 speech frame encoded at 12.2 kbps into one RTP packet) is 35 bytes. When adding RTP/UDP/IPv4 or RTP/UDP/IPv6 (no IPv6 header extensions assumed) header, the maximum SDU sizes are respectively 75 bytes and 95 bytes.

When Robust Header Compression (ROHC) is used the maximum SDU sizes for AMR are 41 bytes and 42 bytes, respectively, when adding compressed RTP/UDP/IPv4 or RTP/UDP/IPv6 headers. For AMR-WB the maximum SDU sizes are 70 bytes and 71 bytes, respectively, when adding compressed RTP/UDP/IPv4 or RTP/UDP/IPv6 headers.

The Adaptive Multi-Rate Wideband (AMR-WB) speech codec was originally developed by 3GPP to be used in GSM and 3G cellular systems. Similar to AMR, the AMR-WB codec is also a multi-mode speech codec. AMR-WB supports 9 wide band speech coding modes with respective bit rates ranging from 6.6 to 23.85 kbps. The sampling frequency used in AMR-WB is 16000 Hz and the speech processing is performed on 20 ms frames. This means that each AMR-WB encoded frame represents 320 speech samples.

For AMR-WB the maximum RTP payload size (encapsulating 1 speech frame encoded at 23.85 kbps into one RTP packet) is 64 bytes. When adding RTP/UDP/IPv4 or RTP/UDP/IPv6 (no IPv6 header extensions assumed) header, the maximum SDU sizes are respectively 104 bytes and 124 bytes.

124 bytes is therefore the maximum packet size for speech traffic.

The multi-rate encoding (i.e., multi-mode) capability of AMR and AMR-WB is designed for preserving high speech quality under a wide range of transmission conditions. With AMR or AMR-WB, mobile radio systems are able to use the available bandwidth as effectively as possible. E.g., in GSM it is possible to dynamically adjust the speech encoding rate during a session so as to continuously adapt to the varying transmission conditions by dividing the fixed overall bandwidth between speech data and error protective coding to enable the best possible trade-off between speech compression rate and error tolerance. To perform mode adaptation, the decoder (speech receiver) needs to signal to the encoder (speech sender) the new mode it prefers. This mode change signal is called Codec Mode Request or CMR.

Since in most sessions speech is sent in both directions between the two ends, the mode requests from the decoder at one end to the encoder at the other end are piggy-backed over the speech frames in the reverse direction. In other words, there is no out-of-band signaling needed for sending CMRs.

Every AMR or AMR-WB codec implementation is required to support all the respective speech coding modes defined by the codec and must be able to handle mode switching to any of the modes at any time. However, some transport systems may impose limitations in the number of modes supported and how often the mode can change due to bandwidth limitations or other constraints. For this reason, the decoder is allowed to indicate its acceptance of a particular mode or a subset of the defined modes for the session using out-of-band means.

For example, the GSM radio link can only use a subset of at most four different modes in a given session. This subset can be any combination of the 8 AMR modes for an AMR session or any combination of the 9 AMR-WB modes for an AMR-WB session.

Moreover, for better interoperability with GSM through a gateway, the decoder is allowed to use out-of-band means to set the minimum number of frames between two mode changes and to limit the mode change among neighbouring modes only.

Both the above described codecs support voice activity detection (VAD) and generation of comfort noise (CN) parameters during silence periods. Hence, the codecs have the option to reduce the number of transmitted bits and packets during silence periods to a minimum. The operation of sending CN parameters at regular intervals during silence periods is usually called discontinuous transmission (DTX) or source controlled rate (SCR) operation. The AMR or AMR-WB frames containing CN parameters are called Silence Indicator (SID) frames.

The term silence does not necessarily mean absolute silence but it is a situation in which the level of voice falls so low that the voice activity detection fails, i.e. the codec determines that there is no speech to encode.

The Internet, like other packet networks, occasionally loses and reorders packets and delays them by variable amounts of time. To cope with these impairments, the RTP header contains timing information and a sequence number that allow the receivers to reconstruct the timing produced by the source, so that, for example, chunks of audio are contiguously played out the speaker every 20 ms. This timing reconstruction is performed separately for each source of RTP packets in the conference. The sequence number can also be used by the receiver to estimate how many packets are being lost.

The AMR and AMR-WB payload format supports several means, including forward error correction (FEC) and frame interleaving, to increase robustness against packet loss.

The simple scheme of repetition of previously sent data is one way of achieving FEC. Another possible scheme which is more bandwidth efficient is to use payload external FEC, e.g., RFC2733, which generates extra packets containing repair data. The whole payload can also be sorted in sensitivity order to support external FEC schemes using UEP.

With AMR or AMR-WB, it is possible to use the multi-rate capability of the codec to send redundant copies of the same mode or of another mode, e.g., one with lower-bandwidth.

AMR or AMR-WB Speech Over IP

A conversational service puts requirements on the payload format. Low delay is one very important factor, i.e., few speech frame-blocks per payload packet. Low overhead is also required when the payload format traverses low bandwidth links, especially as the frequency of packets will be high. For low bandwidth links it also an advantage to support UED which allows a link provider to reduce delay and packet loss or to reduce the utilization of link resources.

A Streaming service has less strict real-time requirements and therefore can use a larger number of frame-blocks per packet than conversational service. This reduces the overhead from IP, UDP, and RTP headers. However, including several frame-blocks per packet makes the transmission more vulnerable to packet loss, so interleaving may be used to reduce the effect packet loss will have on speech quality. A streaming server handling a large number of clients also needs a payload format that requires as few resources as possible when doing packetization. The octet-aligned and interleaving modes require the least amount of resources, while CRC, robust sorting, and bandwidth efficient modes have higher demands.

Another scenario occurs when AMR or AMR-WB encoded speech will be transmitted from a non-IP system (e.g., a GSM or a circuit switched 3GPP network) to an IP/UDP/RTP VoIP terminal, and/or vice versa.

In such a case, it is likely that the AMR or AMR-WB frame is packetized in a different way in the non-IP network and will need to be re-packetized into RTP at the gateway. Also, speech frames from the non-IP network may come with some UEP/UED information (e.g., a frame quality indicator) that will need to be preserved and forwarded on to the decoder along with the speech bits.

A third likely scenario is that IP/UDP/RTP is used as transport between two non-IP systems, i.e., IP is originated and terminated in gateways on both sides of the IP transport.

AMR and AMR-WB RTP Payload Formats

The AMR and AMR-WB payload formats have identical structure, so they are specified together. The only differences are in the types of codec frames contained in the payload. The payload format consists of the RTP header, payload header and payload data.

The duration of one speech frame-block is 20 ms for both AMR and AMR-WB. For AMR, the sampling frequency is 8 kHz, corresponding to 160 encoded speech samples per frame from each channel. For AMR-WB, the sampling frequency is 16 kHz, corresponding to 320 samples per frame from each channel. Thus, the timestamp is increased by 160 for AMR and 320 for AMR-WB for each consecutive frame-block.

Payload Structure

The complete payload consists of a payload header, a payload table of contents, and speech data representing one or more speech frame-blocks.

Transmission of RTP and RTCP Packets

Figure 2:
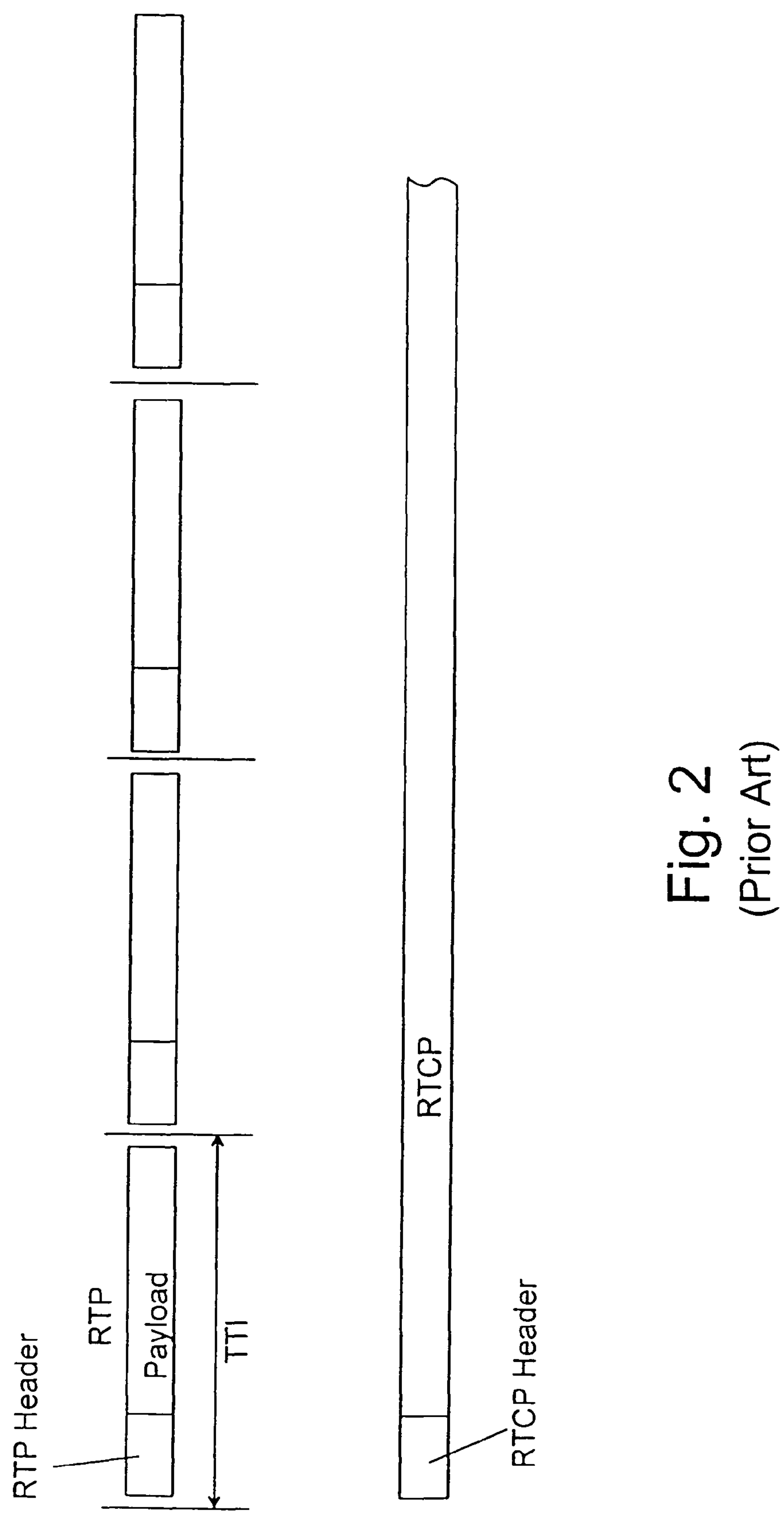

The basic problem in VoIMS is given by the uncontrolled nature of the RTCP traffic, and its possible impact on the RTP traffic, which carries voice data. FIG. 2 shows the situation. In this situation, RTP/UDP/IPv6 headers of the RTP packets are compressed using ROHC RTP/UDP/IP profile, and the UDP/IPv6 headers of the RTCP packets using ROHC UDP/IP profile.

The FIG. 2 shows that, normally, the length of RTCP packets is much larger than the length of RTP packets. Every RTP packet is sent during one 20 ms Transmission Time Interval (TTI). The transmission of one RTCP packet covers multiple transmission time intervals. Since the transmission of RTP and RTCP occurs on the same radio bearer, RTCP packets may cause RTP packets to be delayed or even lost (depending on the RLC discard timer). Ultimately, this produces impairment of the perceived speech quality.

In the above described example it is assumed that the bearer is dimensioned for (maximum) 12.2 kbps AMR mode (RTP payload 32 bytes), so that there is room for ROHC First Order (FO) header and PDCP header, together max. 9 bytes.

It is noted here that the maximum size of the FO header depends on the ROHC implementation. Also, occasional ROHC feedback headers may increase the size of the ROHC header. The dimensioning of the bearer may be somewhat higher or lower, depending on the assumed ROHC header size and depending on the allowed delay.

The example presented the case in UTRAN with usage of Robust Header Compression. The same conclusions can be drawn without usage of ROHC. A similar situation holds also in GERAN networks: instead of the TTI concept, there is a fixed number of time slots reserved for the transmission of the header compressed RTP packet once in 20 ms (e.g., one time slot in each of the consecutive 4 or 5 TDMA frames of 4.615 ms duration).

Several alternatives have been considered recently to overcome the problem presented in the previous section. One proposed alternative suggests of removal of RTCP for VoIMS application contexts i.e. RTCP packets are not transmitted at all in the VoIMS application context. Another proposed alternative suggests that RTP packets and RTCP packets are carried over separate PDP contexts and radio bearers. Yet another proposed alternative relates to RTP frame stealing. This means that RTCP may be prioritised over RTP. In other words, the RTCP packets have higher transmission priority than RTP packets.

It is recognized that the two first proposed alternatives do not lead to interoperable or efficient solutions. The first alternative, among the other things, causes interworking problems when the VoIP endpoints (terminals on endpoints of the conversation) are connected to different communication networks, for example, between wireless 3GPP network and a network supporting IETF standards (for example, internet). The second alternative produces at least an increase of the number of used PDP contexts (at least two for each session) and inaccurate Round Trip Time (RTT) computations. The third solution leads to the increase of the speech frame error rate (FER), since speech/silence InDication (SID) packets are discarded when RTCP is prioritised over RTP.

In addition to the previous alternatives, there are also other proposals, currently discussed in 3GPP RAN WG2 to overcome the problem in UTRAN:

4. Segmentation and concatenation over the radio interface

5. RB/TrCH/PhyCH Reconfiguration

6. Allocation of secondary scrambling code

These methods are primarily for the downlink only, where the number of orthogonal spreading codes is limited. It is assumed that in uplink the bearer can be over-dimensioned. However, problems appear also in uplink, if the RTCP packets are larger than assumed.

About the fourth method, it is mentioned in reference [10] (the full citation for this reference and other prior art references are presented in Appendix A) that "this mechanism requires delaying of some of the RTP packets for the transmission of the RTCP packets to be completed." . . . "The net result is the additional delay and the delay variation (jitter) imposed on RTP (voice) packets, which is not desirable."

According to [10], the drawback of the fifth method is that the "mechanism relies on the radio interface to reconfigure the bearer used for IMS voice to allow higher bandwidth during the transport of RTCP packets. However such reconfiguration could take multiple 100 s of milliseconds and such a large amount of delay imposed on voice service is also not desirable."

The drawback of the sixth method is an increased interference, as mentioned in reference [11]. The interference is dependent on various factors, e.g., the interference may increase drastically when the number of simultaneous connections with a secondary scrambling code gets higher.

Also the possibility to separate RTCP and RTP over different radio bearers (even though they are on the same PDP context and, hence, on the same RAB) has been discussed in reference [12]. The drawback of this solution is that a certain amount of resources needs to be constantly reserved for the two bearers. This amount of resources is typically higher than in the case of one bearer, due to lower multiplexing gain of two separate bearers.

In general, the three above-mentioned radio access level solutions are, at their best, only partial solutions: they are specific to UTRAN (i.e. not applicable to GERAN, e.g., the usage of the secondary scrambling code), and/or they are not applicable in legacy networks (e.g. the reconfiguration).

And even though some of the above-mentioned solutions were used, unpredictable, large size of RTCP packets would cause in most cases unexpected phenomena, e.g., loss of RTP packets.

SUMMARY OF THE INVENTION

This invention includes a solution for optimising the transport of VoIP traffic over IMS. The solution is transparent to all the network units, and therefore valid in both UTRAN and GERAN environments. The invention is generally applicable to any RTP-based application, not just VoIP or VoIMS, but also multimedia streaming, including unidirectional and multicast/broadcast RTP media distribution and conferencing connections. The solution is based on a combination of two main aspects. According to the first aspect the RTCP packet size may be limited and according to the second aspect speech inactivity is utilized for RTCP packet transmission. In the invention also a third aspect relating to informing about maximum RTCP packet size may be considered.

The first aspect of the invention relates to the limitation of the size of RTCP packets to be sent by a VoIMS terminal. The size of the RTCP packets is determined as function of the number of RTP packets. In order to minimize the impact of the RTCP transmission over the RTP flow speech quality, RTCP packet sizes are chosen in such a way that the RTCP packet size is the smallest allowable (legal) RTCP packet size which is a multiple of the size of an RTP packet. This can also be expressed by the following Equation:

$$\text{RTCP\_Packet\_Size} = \min_{N} \mid N \times \text{RTP\_Packet\_Size is a legal size for } RTCP \text{ packets}$$

where by legal size it is intended a size which is multiple of 32 bits words, and N is an integer number (N>=1, $N \in Z_+$). The legal size for an RTCP packet includes all the required RTCP packet parts for a correct and efficient functioning of the application (e.g., Receiver Report(s), Sender Report, SDES packet(s), Encryption prefix, BYE, APP packets, included the necessary report blocks for multicasting or conferencing connections). The requirement is that N must be minimal.

During the VoIP/VoIMS session, several AMR or AMR-WB codec modes can be used (several modes can be defined by the mode-set parameter in SDP [9], or alternatively, the mode-set parameter is non-existent in SDP, meaning that all codec modes are allowed). In such case, the calculation of the RTCP packet size to use can be based on the highest codec mode of the available codec modes (the assumption is that the bearer is dimensioned to the highest codec mode).

The second aspect of the invention relates with scheduling RTCP packets for VoIMS taking into account silence periods in speech.

The ideal situation would be the case where the RTCP packets are naturally scheduled in silence periods. However, this does not always happen, as the silence periods are randomly occurring during a speech call.

In order to make the best use of the silence periods, the scheduling of the RTCP packets at the sending terminal can slightly be modified in this way:

If an RTCP packet is scheduled at a future time and a silence period occurs substantially immediately, then the RTCP packet is sent during the silence period. The next RTCP packet is then re-scheduled with a time offset from the just sent RTCP packet.

This operation should not exceed the bandwidth allocated for RTCP traffic. However, occasionally, this operation may be performed even exceeding instantaneously the allocated RTCP bandwidth. Since RTP and RTCP are carried over the same PDP context, RTCP can safely make use of the remaining PDP context bandwidth, which is not fully utilized by the RTP speech flow during silence periods (i.e., when the speech bit rate is lower, and the increase of the RTCP instantaneous bit rate, if needed, is not harmful for the speech quality and within the bearer size).

It is assumed in this invention that if RTP and RTCP data are transmitted over the same PDP context, RTP speech data is carried using the required PDP context bandwidth, whereas RTCP data is carried using the remainder of the available bandwidth.

The third aspect of this invention relates to the definition of an SDP attribute that signals the maximum RTCP packet size used (in bytes) that a VoIP/VoIMS wants to use during a session. This is signalled from a VoIP/VoIMS endpoint to another VoIP/VoIMS endpoint and vice versa using e.g. the SIP protocol.

This last aspect of the invention is generally applicable to any RTP-based application, not just VoIP or VoIMS, but also multimedia streaming, including unidirectional and multicast/broadcast RTP media distribution and conferencing connections. In these cases the attribute is signalled via any signalling protocol with or without the need of using SDP.

If the offer/answer model is used for media negotiation in SDP [13], the offerer must use a value for the attribute as computed by the invention, and the answerer must answer using a value, which is not higher than the one used by the offerer.

It must be clarified that the method in this invention does not perform any speech frame stealing, or RTCP stream prioritisation over the RTP stream. In fact, the sending VoIP/VoIMS terminal does not change the transmission schedule of the RTP packets and it does not hold RTP packets in buffers. The extra delays/losses experienced at the receiving terminal are side effects caused by the lower protocol layers, based on, e.g., the RLC discard timer, which determine the eventual extra delay (or delay jitter) or the potential loss of speech data.

More details of the approaches will be given in the detailed description of the invention.

The invention has considerable advantages. It provides means for reducing delays of RTP packet transmission wherein disturbances due to delayed speech packet transmission (because of RTCP packet transmission) are also reduced. Therefore, the invention optimises the quality of VoIP and VoIMS terminals. Also the invention is applicable to both UTRAN and GERAN networks, because the mechanism in network transparent.

DRAWINGS

Figure 3:
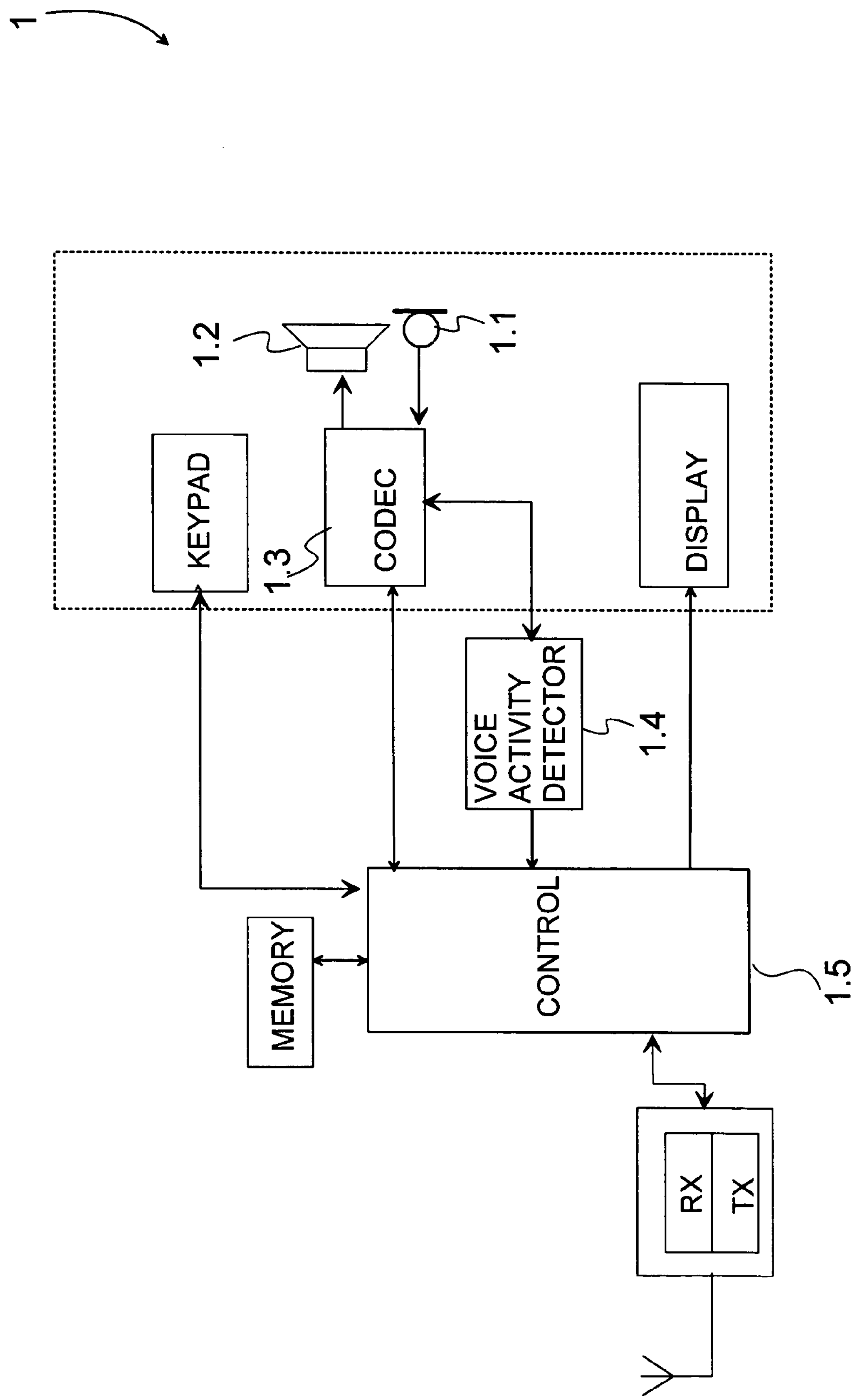
Figure 4:
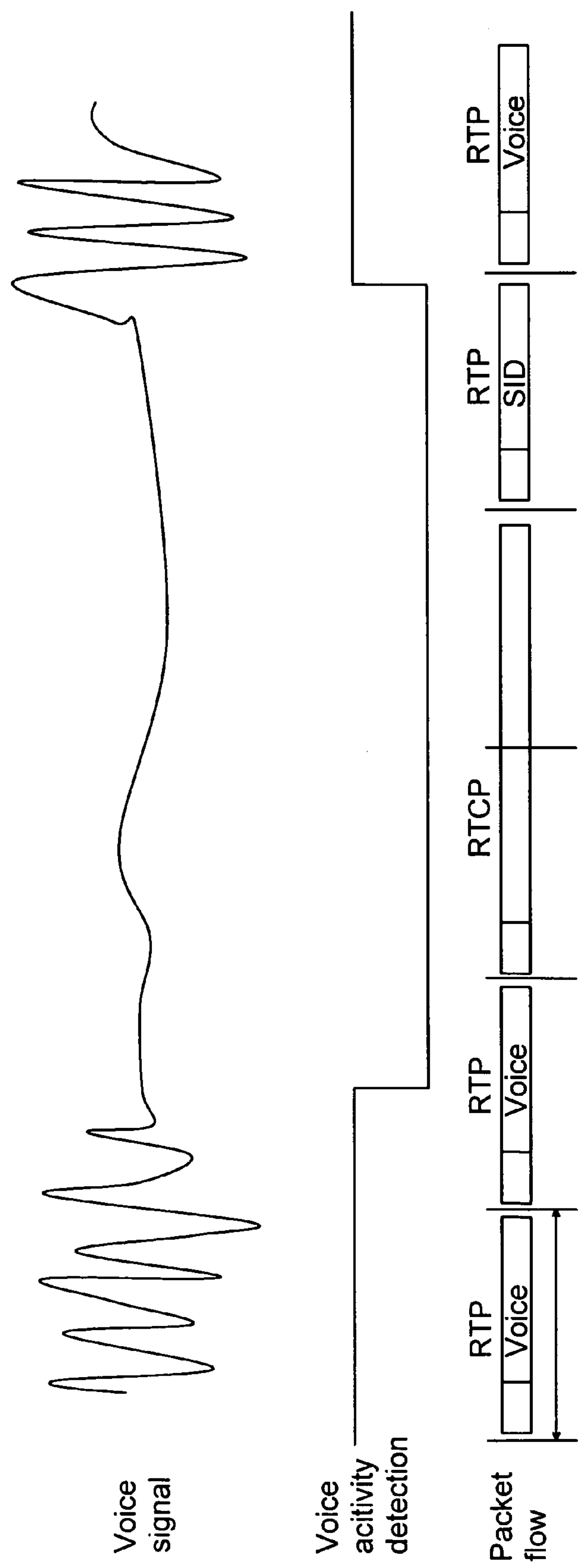

The invention will be described in more detail with reference to the attached drawings, in which FIG. 1 depicts an example of a conversation session between two terminals using VoIP, FIG. 2 illustrates the size differences between RTP and RTCP packets, FIG. 3 depicts an example embodiment of a terminal according to the present invention, FIG. 4 shows an example of packet stream in which the present invention is applied, and FIGS. 5*a* and 5*b* show as signalling diagrams examples of negotiation of packet size between terminals.

DETAILED DESCRIPTION OF THE PRESENT INVENTION

In the following, the operation of the invention during silence periods will be described with reference to the system of FIG. 1 and the terminal of FIG. 3. The terminal 1 comprises an audio-to-electric converter 1.1 such as a microphone, an electric-to-audio converter 1.2 such as a loudspeaker, and a codec 1.3 for performing encoding and decoding operations for audio. The terminal also comprises a voice activity detector 1.4 which tries to determine whether there is speech going on or pause in the speech (i.e. silence). The determination may be performed on the basis of analog signal from the signals received from the audio-to-electric converter 1.1, or on the basis of digital speech information provided by the codec 1.3. In the latter case, the codec, which can be AMR codec or AMR-WB codec, forms frames of the speech and attaches a frame type indication to the frame. Therefore, silence is detectable by the sending terminal by e.g. looking at the Frame Type field in the payload Table Of Contents of the AMR or AMR-WB RTP streams. The terminal also comprises a control block 1.5 to control the operations of the terminal 1.

It is possible to send RTCP packets during the silence periods with no impact on the speech quality. During the silence periods, RTCP packets of normal size can be used. However, due to the unpredictability of the silence length, it is normally better to use short RTCP packets than long RTCP packets. This minimizes the impact of RTCP packet transmission on the RTP flow in case the RTCP packet is sent just before the silence period is over.

This approach may produce delay/loss of SID packets, but this fact has no significant negative impact on the speech quality. In addition, the impact of lost/delayed SID packets is really minimal as the RTP packet rate during silence periods is much smaller than 50 packets per second, and many of the transmission time interval slots are freely usable for RTCP data.

In the present invention the scheduling of RTCP packets can be modified, when necessary, as explained in the previous section in this way. When the voice activity detector 1.4 determines that there is a pause (silence period) in the speech, the rescheduling is performed. For example, the control block 1.5 if there is a RTCP packet waiting for transmission and the transmission of such a packet is scheduled to happen at a future time, then the transmission of that RTCP packet is initiated, i.e. the RTCP packet is sent substantially immediately (or at any point of time during the silence period) after the silence period is detected. In addition to that, if there is another RTCP packet waiting for transmission, the next RTCP packet is re-scheduled with a time offset from the just sent RTCP packet. This procedure can also be expressed as a pseudo code:

```
If ((RTCP packet is scheduled at a future time) and (silence period
occurs immediately)) then {
        RTCP packet is sent during the silence period;
        The next RTCP packet is re-scheduled with a time offset
        from the just sent RTCP packet
}
```

This operation is normally performed taking into account not to exceed the bandwidth allocated for RTCP traffic, but with possibility of exceeding such bandwidth as explained above.

Next, the operation during speech activity periods will be described. During the periods of active speech, the impact of the RTCP traffic on the RTP traffic must be minimal.

In the following, some examples are given to further clarify the invention. It should be notified here that although certain numbers and other specific details are given they are just examples and they are not to be regarded as limiting the scope of the present invention.

In principle, RTCP compound packets (including one Sender Report and one SDES packet) can be of any size greater or equal than 112 bytes when packets according to uncompressed headers and IPv6 protocol are used, or greater or equal than 68 bytes when using compressed headers ROHC and IPv6 protocol. Even if no restrictions on the RTCP packet sizes are defined by IETF, practical implementations of VoIMS terminals should consider to minimize the size of RTCP packets, in order to also minimize the impact of the RTCP flow on the speech quality of the transmitted RTP data.

The proposed limit for RTCP header compressed packets is 2-4 times the length of header compressed RTP packets.

In this way, when using AMR at 4.75 kbps with a header compressed RTP packet size of 21 bytes, it will enable to send RTCP header compressed packets up to 4 times the RTP packets size i.e., 84 bytes. This leaves 16 bytes room for optional RTCP packet fields. In this case the maximum delay/loss impact of RTCP on RTP would be over 4 consecutive RTP packets.

When using AMR-WB at 23.85 kbps with a header compressed RTP packet size of 68 bytes, it will enable to send RTCP header compressed packets up to 2 times the RTP packets size i.e., 136 bytes. This leaves 24 bytes room for optional RTCP packet fields. In this case the maximum delay/loss impact of RTCP on RTP would be over 2 consecutive RTP packets.

The proposed limit for RTCP header uncompressed packets is 1-2 times the length of the RTP packets having uncompressed header.

In this way, when using AMR at 4.75 kbps with a header uncompressed RTP packet size of 74 bytes, it will enable to send RTCP header uncompressed packets up to 2 times the RTP packets size i.e., 148 bytes. This leaves 36 bytes room for optional RTCP packet fields. In this case the maximum delay/loss impact of RTCP on RTP would be over 2 consecutive RTP packets.

When using AMR-WB at 23.85 kbps with a header uncompressed RTP packet size of 121 bytes, it will enable to send RTCP header uncompressed packets up to 1 times the RTP packets size i.e., 121 bytes. This leaves 9 bytes room for optional RTCP packet fields. In this case the maximum delay/loss impact of RTCP on RTP would be over 1 RTP packet.

The proposed values for RTCP packets are not hard value limits, but also larger RTCP could be used. However, this must be carefully considered as larger packets may increase RTP packet delay/loss.

During the VoIP/VoIMS session, several AMR or AMR-WB codec modes can be used (several modes can be defined by the mode-set parameter in SDP [9], or alternatively, the mode-set parameter is non-existent in SDP, meaning that all codec modes are allowed). In such case, the calculation of the RTCP packet size to use can be based on the highest codec mode of the available codec modes. The assumption is that the bearer is dimensioned to the highest codec mode.

Next, an example of the third aspect of the presenting invention is described, i.e. signaling of Maximum RTCP packet size in SDP.

In the following, an example SDP transmitted from a VoIMS endpoint is shown. This includes a new attribute (expressed in bytes) for defining the maximum RTCP packet size that the sending terminals wants to use during a session:

v=0 o=–950814089 950814089 IN IP4 144.132.134.67 s=Example of AMR speech e=foo@bar.com c=IN IP4 0.0.0.0 m=audio 0 RTP/AVP 97 b=AS:13 b=RS:300 a=rtpmap:97 AMR/8000 a=fmtp:97 a=RTCPmaxsize: 150

The last line of definition shows the new attribute.

If the offer/answer model is used for media negotiation in SDP [13], the offerer must use a value for the attribute as computed by the invention, and the answerer must answer using a value, which is not higher than the one used by the offerer. This rule allows IETF and 3GPP endpoint to interoperate easily.

In the following, a couple of examples are disclosed with reference to signalling diagrams in FIGS. 5*a* and 5*b*. In the first example of FIG. 5*a* it is supposed that 150 bytes is the right size of RTCP packets. The offering terminal, e.g. the terminal 1 in FIG. 1, sends a message, which indicates that the terminal proposes the value 170 for the RTCPmaxsize. The answering terminal, e.g. the terminal 2 in FIG. 1, sends a reply message, which indicates that the terminal wants to reduce the value to 150 for the RTCPmaxsize. The offering terminal examines the value in the reply message and determines that the value is acceptable, and both terminals start using the same maximum RTCP packet size.

In the second example of FIG. 5*b* it is supposed that 150 bytes is the right size of RTCP packets. The offering terminal, e.g. the terminal 1 in FIG. 1, sends a message, which indicates that the terminal proposes the value 150 for the RTCPmaxsize. The answering terminal, e.g. the terminal 2 in FIG. 1, sends a reply message, which indicates that the terminal accepts the suggested value 150 for the RTCPmaxsize. The offering terminal examines the value in the reply message and, as it is the same as suggested, determines that the value is acceptable, and both terminals start using the same maximum RTCP packet size.

When designing the system according to the present invention, care should be taken in choosing the right RTCP bandwidth in such a way that the speech quality is not degraded. If the RTCP bandwidth is too large, the RTCP packet rate is high. This risks to compromise the speech quality, as there are too frequent RTCP packets, and consequently too many RTP packets delayed/lost.

APPENDIX A

[1] RTCP Packet Size Limitation for Voice over IP Traffic, Nokia, Tdoc S4-020598, 3GPP SA4#23 meeting, Montreal, Canada, 30 Sep. 4 Oct. 2002.

[2] Liason Statement on Optimization of Voice over IMS, Tdoc S4-030614, 3GPP SA4#28 meeting, Erlangen, Germany, 1-5 Sep. 2003.

[3] Optimization of Voice over IMS, Three, Tdoc S2-033102, 3GPP SA2#34, Brussels, Belgium, 25-29 Aug. 2003.

[4] RTP-RTCP Multiplexing, Three, Tdoc S2-033127, 3GPP SA2#34, Brussels, Belgium, 25-29 Aug. 2003.

[5] RTP-RTCP Separation, Three, Tdoc S2-033128, 3GPP SA2#34, Brussels, Belgium, 25-29 Aug. 2003.

[6] RTCP Removal, Three, Tdoc S2-033136, 3GPP SA2#34, Brussels, Belgium, 25-29 Aug. 2003.

[7] RTP: A Transport Protocol for Real-Time Applications, IETF RFC 3550, July 2003.

[8] Radio Link Control (RLC) Protocol Specification, 3GPP TS 25.322, v. 5.6.0, 2003-09.

[9] Real-Time Transport Protocol (RTP) Payload Format and File Storage Format for the Adaptive Multi-Rate (AMR) and Adaptive Multi-Rate Wideband (AMR-WB) Audio Codecs, IETF RFC 3267, June 2002.

[10] RAB support for IMS, 3GPP RAN WG2 internal Release 6 report (first draft for e-mail review over 3GPP_TSG_RAN_WG2 distribution list, TR number not yet allocated to the report)

[11] Handling of variable data rates for conversational IMS, Siemens, Tdoc R2-030237, 3GPP RAN2#34, Sophia Antipolis, France, 17-21 Feb. 2003

[12] RTCP Handling: Separation or Multiplexing, Alcatel, Tdoc S2-033598, 3GPP SA2#35, Bangkok, Thailand, 27-21 Oct. 2003.

[13] An Offer/Answer Model with the Session Description Protocol (SDP), IETF RFC 3264, June 2002.

What is claimed is:

1. An apparatus comprising:

a transmitter configured to transmit voice to at least one terminal over a network, an encoder configured to form first packets for transmitting voice, a control block configured to form second packets for transmitting control information and schedule the transmission of at least one of said second packets at a future time, and a voice activity detector configured to detect a voice period or a silence period, wherein the control block is configured to initiate the transmission of the at least one of said second packets upon detection of the start of the silence period instead of transmitting the at least one of said second packets at the future time.

2. The apparatus according to claim 1, wherein the control block is configured to initiate the transmission of at least one of said second packets in the beginning of the detected silence period.

3. The apparatus according to claim 1, wherein the control block is configured to re-schedule the transmission time of another packet of said second packets on the basis of the transmission time of the second packet which was transmitted during the detected silence period.

4. The apparatus according to claim 1, wherein at least one of said second packets is transmitted immediately upon detection of the silence period.

5. The apparatus according to claim 1, further comprising a limiter configured to limit the size of the second packets.

6. The apparatus according to claim 1, wherein said first packets are real-time transport protocol packets, and said second packets are real-time transport protocol control protocol packets.

7. A system comprising:

a terminal, at least one network configured to transmit voice from said terminal to at least one other terminal over said at least one network, the terminal comprising:

an encoder configured to form first packets for transmitting voice, a control block configured to form second packets for transmitting control information and schedule the transmission of at least one of the second packets at a future time, the network comprising a bearer service configured to transmit said first and said second packets, the terminal comprising a voice activity detector configured to detect a voice period or a silence period, wherein the control block is configured to initiate the transmission of the at least one of said second packets upon detection of the start of the silence period instead of transmitting the at least one of said second packets at the future time.

8. The system according to claim 7, wherein the control block is configured to initiate the transmission of at least one of said second packets in the beginning of the detected silence period.

9. The system according to claim 7, wherein the transmission time of a next packet of said second packets is arranged to be re-scheduled on the basis of the transmission time of the second packet which was transmitted during the detected silence period.

10. The system according to claim 7 comprising a codec configured to form one packet data protocol context for transmission of both said first packets and said second packets.

11. The system according to claim 10, wherein a bandwidth is available for the voice transmission, and the control block is configured to reserve required packet data protocol context bandwidth for transmission of said first packets, wherein said second packets are arranged to be transmitted using the remainder of the available bandwidth.

12. The system according to claim 7, wherein a bandwidth is available for the voice transmission, and the control block is configured to reserve required packet data protocol context bandwidth for transmission of said first packets, and for reserving required packet data protocol context bandwidth for transmission of said second packets.

13. The system according to claim 7, wherein at least one of said second packets is transmitted immediately upon detection of the silence period.

14. An apparatus comprising:

means for transmitting voice to at least one terminal over a network, means for forming first packets for transmitting voice, means for forming second packets for transmitting control information, and for scheduling the transmission of at least one of said second packets at a future time, means for detecting a voice period or a silence period, and means for initiating the transmission of the at least one of said second packets upon detection of the start of the silence period instead of transmitting the at least one of said second packets at the future time.

15. The apparatus according to claim 14, wherein at least one of said second packets is transmitted immediately upon detection of the silence period.

16. A method comprising:

transmitting, by a transmitter, voice to at least one terminal over a network, forming, by an encoder, first packets for transmitting voice, forming, by a control block, second packets for transmitting control information, scheduling, by the control block, the transmission of at least one of said second packets at a future time, detecting, by a voice activity detector, voice activity to determine whether there is a voice period or a silence period, and initiating, by the control block, the transmission of the at least one of said second packets upon detection of the start of the silence period instead of transmitting the at least one of said second packets at the future time.

17. The method according to claim 16, further comprising initiating transmission of at least one of said second packets in the beginning of the detected silence period.

18. The method according to claim 16, further comprising re-scheduling the transmission time of a next packet of said second packets on the basis of transmission time of the second packet which was transmitted during the detected silence period.

19. The method according to claim 16, wherein voice over internet protocol is used in the voice transmission.

20. The method according to claim 16, wherein said first packets are real-time transport protocol packets, and said second packets are real-time transport protocol control protocol packets.

21. The method according to claim 16, wherein at least one of said second packets is transmitted immediately upon detection of the silence period.

22. The method according to claim 16, further comprising limiting the size of the second packets.

* * * * *